July 9, 1963 — E. J. WELLAUER ETAL — 3,096,632
COUPLING
Filed July 24, 1961
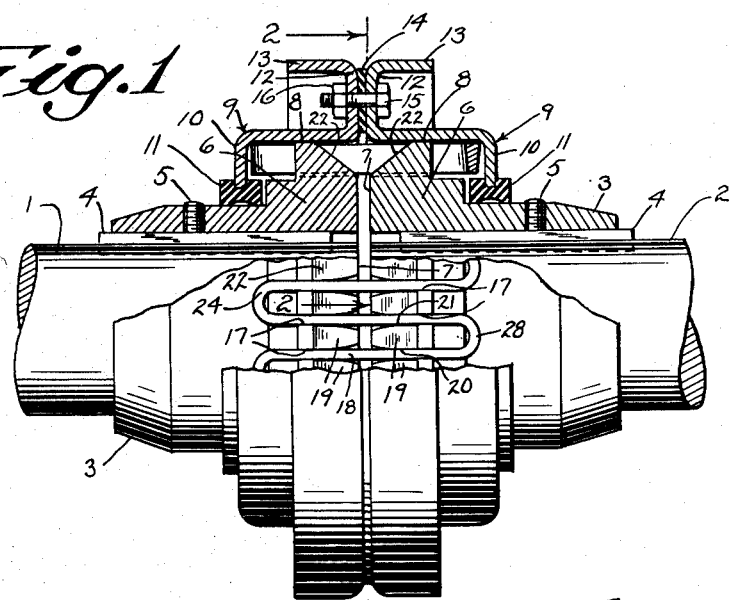
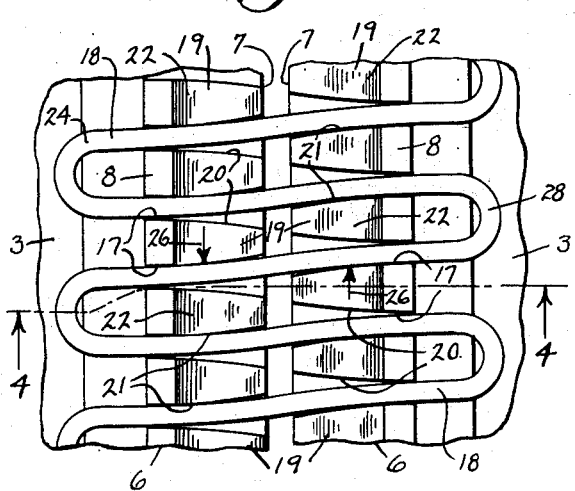
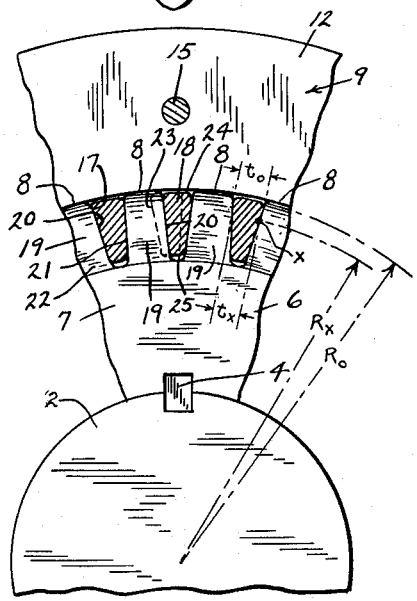
INVENTORS
EDWARD J. WELLAUER
ALFRED G. BADE
BY Adrian L. Bateman Jr.
ATTORNEY

United States Patent Office 3,096,632
Patented July 9, 1963

3,096,632
COUPLING
Edward J. Wellauer, Wauwatosa, and Alfred G. Bade, Brookfield, Wis., assignors to The Falk Corporation, Milwaukee, Wis., a corporation of Wisconsin
Filed July 24, 1961, Ser. No. 126,274
6 Claims. (Cl. 64—15)

This invention relates to flexible couplings of the type in which coupling hub members affixed to adjacent ends of the shafts to be coupled are provided with axially directed peripheral teeth which define slots adapted to receive resilient interconnecting grid members, and specifically resides in a coupling of that type in which the grid supporting teeth each has a varying effective radial height with the minimum height being provided adjacent the interior surface of the respective hub member.

Previously couplings which utilize resilient, relatively stiff torque transmitting grid members have employed coupling teeth of substantially constant radial height with the side walls thereof provided with curved surfaces, the axes of revolution of which lie in a plane perpendicular to the axes of the interconnected shafts. As is well known to those skilled in the art, the effect of the curved side walls is to reduce the unsupported length of the grid member as the relative angular displacement between the two hub members increases under increasing coupling loads thereby providing the maximum strength under full coupling load.

In such previous couplings having teeth of uniform height, the teeth present straight, radial supports for the grid member and, therefore, at each condition of load the unsupported length of each fiber of the grid member along the line of contact with the associated teeth will be the same. The equal unsupported lengths of the fibers result in a non-uniform distribution of stress along the cross section of the grid member. The fibers located at the radially outer surface of the grid member are subjected to stresses far in excess of the average stress and, since coupling capacity is dependent on the maximum stress, the result of such non-uniform distribution of grid stresses is an inefficient use of the grid material.

The non-uniform distribution of stress present in previous couplings is greatest when the grid member and complementary coupling hub slots are provided with a tapered cross section such as shown and described in the copending application of our co-worker, Walter P. Schmitter, for "Coupling," Serial No. 105,529, filed April 20, 1961. The portion of the total load on the grid member which is distributed to the fibers located at the radially outer surface of the grid member is largest since such fibers are subjected to the greatest circumferential displacement, or deflection, and the thickness of the grid member is greatest at such fibers. The total load on the grid member will be distributed to each fiber in direct proportion to the amount of displacement and in direct proportion to the third power of the thickness of the grid member at the fiber. The stress at each fiber will vary directly with the load on the fiber and inversely with the second power of the thickness of the grid member at the fiber. The result of such relationships is that the stress on each fiber will be in direct proportion with the circumferential displacement and with the grid member thickness. Therefore, in previous couplings having coupling teeth of constant height and utilizing a tapered grid, the stress on the radially outer fibers is much greater than the stress on the radially inner fibers.

While the non-uniform distribution of grid member stresses with uniform height coupling teeth is most pronounced for a tapered grid, the same problem arises when grid members having rectangular cross sections are utilized. With rectangular grid members, the non-uniform stress distribution results from the unequal amount of circumferential displacement, or deflection, of each fiber under load.

The coupling of the present invention provides a more uniform distribution of the grid member stresses, with an attendant increase in the coupling capacity, by providing the radially outer grid fibers with the greatest unsupported length, thereby offsetting the effects of circumferential displacement and grid member thickness. The varying unsupported length is produced by providing the coupling with teeth having a varying radial height so that biased, or inclined, supports are provided for the grid member. The amount of such biased support utilized by the grid member increases as the relative angular displacement of the hub members increases, thereby providing the maximum benefits at full coupling load. Whether the grid member has a rectangular cross section or a tapered cross section, the varying unsupported length results in a more uniform distribution of stresses throughout the cross section of the grid member and primarily at the critical section, which is along the limit of contact. Since the maximum stress in the radially outer fibers will approach the average stress on the grid member, the ultimate strength of the entire grid member is increased over that which would result from straight radial grid supports.

A further effect of the biased or inclined tooth is an increase in the strength of the tooth itself. Since the total contact between the grid member and each tooth is reduced, the moment arm of the reaction load placed upon each tooth by the grid member is reduced, thereby decreasing the moment on the tooth with attendant reduction in the stress.

It is, therefore, an object of this invention to provide a flexible coupling of increased strength and capacity.

It is another object of this invention to provide a flexible coupling in which there is improved distribution of stress along the critical cross section of an interconnecting grid member.

It is still another object of this invention to provide a flexible coupling having a plurality of teeth with varying radial heights whereby the unsupported length of an interconnecting grid member will be greatest at its radially outer surface.

It is a further object of this invention to provide a flexible coupling in which the stress distribution along the cross section of the interlinking grid member becomes more uniform as the coupling load increases.

It is a still further object of this invention to provide a flexible shaft coupling in which the strengths of the interconnecting grid member and coupling teeth are increased by providing the teeth with a varying radial height.

The foregoing and other objects and advantages of the coupling of this invention will appear from the following description. In the description reference is made to the accompanying drawing which forms a part hereof and in which there is shown by way of illustration, and not of limitation, a specific embodiment in which the invention may reside.

In the drawing:
FIG. 1 is a view in elevation, and partly in section, of a coupling in accordance with the present invention,
FIG. 2 is a fragmentary view in elevation of the interior face of a hub member showing a tapered grid member seated therein,
FIG. 3 is a fragmentary view in elevation of the coupling teeth and interlinking grid member of a loaded coupling in accordance with this invention, and
FIG. 4 is a view in section taken along the plane of line 4—4 of FIG. 3.

Referring now to the drawing, as shown in FIG. 1 the coupling of the present invention is adapted to provide a connection between a driving shaft 1 and a driven shaft 2. The coupling comprises a pair of similar hub members 3 which are bored to receive the driving and driven shafts 1 and 2. The hub members are each provided with slots to receive keys 4 which are further received in cooperating slots provided in the shafts 1 and 2, thereby assuring rotation of the hub members 3 with their respective shafts. To prevent axial movement of the hub members 3 relative to their respective shafts, set screws 5 permit the fixing of the hub members 3 relative to the keys 4.

Each hub member 3 includes a flange 6 disposed peripherally about that portion of the hub adapted to be placed in facing relationship with the adjacent hub, and each flange 6 has its interior surface in the same plane as the interior face of its respective hub member 3 to thereby define an inner face 7 of the hub member. The circumference of each flange 6 defines a raised cover supporting surface 8.

Suitable coupling cover members, which may be identical, and are designated generally by the numeral 9, are provided to act as a shield to prevent the entry of dust and grit and also to act as a lubricant retainer housing for the coupling. Each cover member 9 has an inwardly bent portion 10 which is seated in a resilient sealing ring 11 disposed about the periphery of the respective hub member 3. The resilient sealing ring 11 may be formed of rubber, neoprene or other resilient materials resistant to deterioration in the presence of lubricants. Each cover member 9 also includes an upwardly bent flange portion 12 and an outwardly bent flange portion 13. As may be seen in FIG. 1, the flange portions 12 of the cover members 9 are adapted to be placed in facing relation separated by a gasket 14. The cover members 9 are held in such relation by a plurality of cooperating bolts 15 and nuts 16 journaled through aligned holes provided in the flange portions 12 and gasket 14. As thus viewed, a coupling cover is formed of the two cover members 9 secured together and supported on the hub members 3 by the sealing rings 11 and supporting surfaces 8 of the flanges 6. The cover also may include an aperture (not shown) for the introduction of lubricant under pressure to its interior.

The flanges 6 of the hub members 3 are provided with a series of radially spaced axially directed slots 17 which are adapted to receive an interconnecting grid member. The grid receiving slots may be formed to receive either rectangular or tapered grid members, and for purposes of illustration only, a serpentine tapered grid member having rungs 18 connected by integral end loops 28 is shown in the drawing. The slots 17 form a series of peripherally spaced coupling teeth 19 having side walls 20 and 21. The side walls 20 and 21 are each provided with curved surfaces, the axes of revolution of which lie in a plane perpendicular to the axes of the shafts 1 and 2. Such curvature of the side walls 20 and 21 is shown exaggerated in FIGS. 1 and 3 for clarity.

Each of the coupling teeth 19 is provided with an effective radial height which varies from a minimum at the inner faces 7 of the hub members 3 to a maximum at the supporting surfaces 8 of the flanges 6 thereby producing biased, or inclined, coupling teeth. A top surface 22 of each tooth 19 is formed which slopes downwardly from the supporting surface 8 toward the inner face 7 of the respective hub member 3. The biased teeth 19 will thereby present inclined supports for the rungs 18 of the grid member as shown in FIG. 4.

The non-uniformity of stress distribution of prior art grid members which is greatly improved by the present invention can best be understood by reference to FIGS. 2 and 3. Under load, the hub members 3 will be displaced angularly relative to each other. Let it be assumed that the longitudinal center of the grid member remains stationary under load and that the hub members 3 are angularly displaced in opposite directions about the center of the grid member. The portions of the grid rungs 18 in contact with the teeth 19 will be displaced along with the hub members 3 and will then assume a position relative to their unloaded position which is illustrated in exaggerated form in FIG. 2 by the dotted line 23 for one rung 18 of the grid member. Under load and for the condition of bending without twist wherein the angular displacement of each fiber of the grid rung 18 in a radial plane is the same, it will be seen that the fibers at the radially outer surface 24 of the grid rung 18 will be displaced circumferentially a greater distance than the fibers at the radially inner surface 25 due to the difference in their radial position. The total load placed on the grid rung 18, upon relative angular displacement of the shafts 1 and 2, will be distributed to each fiber in direct proportion with the amount of circumferential displacement of that fiber and will vary inversely with the third power of one-half of the unsupported length of that fiber. In prior flexible couplings, wherein the coupling teeth 19 have a constant height in the radial plane, the straight radial supports presented thereby result in each fiber at the critical cross section along the support having substantially the same unsupported length, although the length varies uniformly with the load on the coupling. Since, in prior couplings, the unsupported length is constant at any condition of load, a greater load is placed on the fibers at the outer surface 24 than on the fibers at the inner surface 25.

In addition to the load differential produced by the difference in the circumferential displacement, or deflection, of the fibers, a further load differential is caused by the varying thickness of the tapered grid member. The load distributed to each fiber is, in addition to being directly proportional to the circumferential displacement of that fiber, also directly proportional to the third power of the thickness of the grid rung 18 at the location of the fiber. Since the fibers at the outer surface 24 of the grid rung 18 are located at the point of maximum thickness, the proportion of the resultant load on the grid member distributed to the fibers at the outer surface 24 will be far in excess of the amount of the load distributed to the fibers at the inner surface 25.

The stress on each fiber is directly proportional to the amount of load on that fiber and inversely proportional to the second power of the thickness of the grid rung 18 at the fiber. Therefore, the ultimate effect of a coupling having a uniform tooth height in the radial direction is that, for a tapered grid member, the stress on the fibers at the outer surfaces 24 will be greatly in excess of the stress on the fibers at the inner surface 25 because at the outer surface 24 both the thickness and the circumferential displacement are the greatest. Thus a non-uniform stress distribution results in prior art couplings.

In the coupling of the present invention the biased coupling teeth 19 produce a varying unsupported length for the fibers along the critical cross section, with the greatest unsupported length being provided for the fibers located at the outer surface 23. Referring to FIG. 4, the coupling of this invention is shown therein under a condition of load in excess of the normal load. The curved side walls 20 and 21 of the teeth 19 permit a reduction in the average unsupported length of the grid rungs 18 as the relative angular displacement between the shafts 1 and 2 increases. At such a load in excess of the normal load, the limit of contact between the grid rung 18 and each associated tooth 19 may be represented by arrows 26 in FIG. 3 and by vertical lines 27 in FIG. 4. At the conditions of load represented in FIGS. 3 and 4, it will be noted that the biased teeth 19 provide partial inclined support to each grid rung 18 whereby the fibers at the top surface 24 have a greater unsupported length than the fibers at the bottom surface 25. Since the load is distributed to each fiber in inverse proportion to the third power of one-half of the unsupported length, by providing the fibers at the outer surface 24 with the greatest unsupported length the undesirable effects of circumferential displacement and grid member thickness are offset. This results in a more uniform distribution of stress over the cross section and particularly at the support.

As the limit of contact 26 advances towards the coupling gap defined by the adjacent inner faces 7, the difference between the unsupported lengths of inner and outer fibers becomes greater, and under full load, the grid rung 18 will be supported entirely along the tooth bias. Therefore, the maximum benefits of the biased tooth are achieved under the most severe load conditions.

While the improved stress distribution resulting from the biased teeth 19 is most pronounced for a tapered grid member, the stress distribution on a rectangular grid member will also be improved. However, since the thickness of a rectangular grid member is constant, the differential in unsupported lengths is required to offset only the undesirable effects of the non-uniform circumferential displacements of the fibers.

It will also be noted that as the load on the coupling increases the length of the line 27 representing the limit of contact will decrease and that in all cases the length of the line 27 is less than it would be for a coupling tooth of uniform radial height. The reduced contact between the grid rungs 18 and the teeth 19 has the effect of lowering the point through which the resultant force on each tooth 19 will act. Since the resultant force is the same for a biased and a uniform height tooth for any amount of load and the moment arm of that force relative to the base of the coupling tooth is reduced, the total effect is a reduction of the stress on each coupling tooth 19.

The degree of bias which should be provided in the teeth 19 to provide uniform stress on the grid rungs 18 may be determined from the following relationship:

$$\frac{a_x}{a_o}=\frac{1}{2}\left[\frac{3L}{2a_o}-\sqrt{\left(\frac{3L}{2a_o}\right)^2-4\left(\frac{3L}{2a_o}-1\right)\frac{R_x t_x}{R_o t_o}}\right]$$

in the above relationship, "$a_x$" is one-half of the unsupported span of a fiber "$x$" of the grid rung 18 located at a radial distance "$R_x$" from the coupling axis (see FIGS. 2 and 4), "$a_o$" is one-half of the unsupported span of a fiber at the outer surface 24 of the grid rung 18 located at a radial distance "$R_o$" from the coupling axis, and "$L$" is one-half of the total length of an element of the grid member measured from end loop to end loop. As shown in FIG. 4, "$a_x$," "$a_o$" and "$L$" may be taken from the center line of the coupling gap defined by the inner faces 7 of the hubs 3. Referring to FIG. 2, "$t_x$" is the thickness of the grid rung 18 at the location of the fiber "$x$" and "$t_o$" is the thickness of the grid rung 18 at the outer surface 24. For a rectangular grid member, "$t_x$" and "$t_o$" will, of course, be the same. The above relationship assumes a line contact between the grid rungs 18 and the teeth 19, which experimentation has shown to be a valid assumption.

It will be noted that the above relationship will yield a curved line and would result in a curved contour for the surface 22. However, to provide simplicity of construction and formation of the teeth 19, a practical straight line bias can be obtained to fit closely the curved line. The slope of the practical lineal bias which is provided in the teeth 19 will vary depending upon the cross-sectional configuration of the grid member utilized. Thus, the maximum slope must be provided when a rectangular grid member is used, and the minimum slope must be provided when a grid member having a triangular cross section is used. The straight-line slope to be provided for each of the above extremes may be expressed in terms of the coupling gap, or distance between the inner faces 7 of the hubs 3, and the radial width of the grid rungs 18. Thus, for a rectangular grid, the slope may equal 0.465 times the ratio of one-half of the coupling gap to the radial width of the grid rung 18. For a triangular grid member, the slope may equal 5.33 times the ratio of one-half of the coupling gap to the radial width of the grid rung 18. Again, the above lineal relationships assume a line contact between the grid rungs 18 and teeth 19.

It will be appreciated that it is not necessary to completely remove the tooth material above the bias since all that is required for the achievement of the present coupling is that the portions of the side walls 20 and 21 which contact the grid member 18 are provided with the varying effective radial height herein described.

The improved stress distribution and attendant increase in coupling capacity may be obtained with all types of grid members. Thus, in addition to having application for grid members having various cross sections, the coupling may be advantageously employed with either single or multiple grid members and with either continuous or single section beam type grid members. The material from which the grid members are formed may be metal or other substances which are capable of providing resiliency with relative axial stiffness. Soft, flexible or excessively brittle substances are not suitable.

It will be seen from the above description that the coupling of this invention has increased capacity resulting from reducing the maximum stresses on the critical points of the coupling, specifically the fibers at the outer surface 24 of each grid rung and at the base of the coupling teeth 19. Such increase in capacity is greatest under the most severe load conditions, and may be achieved with various types of grid members. By reducing the maximum stress at the outer fiber and providing a more uniform distribution of stress over the cross section of the grid members the grid member material is efficiently utilized.

We claim:

1. A coupling for connecting driving and driven shafts comprising a pair of hubs connectable to said driving and driven shafts for rotation therewith and having interior surfaces in facing relationship, each of said hubs being provided with a plurality of axially extending teeth having their adjacent side faces defining slots therebetween, said teeth having a varying effective radial height along the hub axis with the minimum height adjacent the interior surface of the hub; and a grid member received in the slots in said hubs to form a resilient torque transmitting element between said hubs, the variation of the effective radial height extending over a substantial portion of the radial width of said grid member.

2. A coupling for connecting driving and driven shafts comprising a pair of hubs connectable to said driving and driven shafts for rotation therewith and having interior surfaces in facing relationship, each of said hubs having a plurality of peripherally spaced, axially directed teeth having their adjacent side faces defining slots therebetween, said teeth having an effective radial height which varies linearly along the axis of the hub with the minimum height adjacent the interior surface of the hub; and a grid member received in the slots in said hubs to form a resilient torque transmitting element between said hubs, the side faces of said teeth being curved whereby the minimum unsupported length of said grid member decreases as the relative angular displacement between the hub members increases.

3. A resilient coupling for connecting driving and driven shafts comprising a pair of hub members adapted for attachment to said shafts for rotation therewith and having interior surfaces in facing relationship, each of said hub members having a plurality of axially extending teeth having adjacent side faces defining slots therebetween; and a grid member received in said slots, said teeth being biased along the axis of the hub member toward the interior surface thereof and substantially coextensive with the radial width of said grid member whereby the unsupported length of the grid member is greatest at its radially outer surface.

4. A resilient coupling for connecting driving and driven shafts comprising a pair of hub members adapted for attachment to said shafts for rotation therewith and having interior surfaces in facing relationship, each of said hub members having a plurality of axially extending teeth having adjacent side faces defining slots therebetween; and a grid member received in said slots, said teeth being biased along the axis of the hub member toward the interior surface thereof and substantially coextensive with the radial width of said grid member, said side faces being curved whereby the distribution of stress on the cross section of the grid member is uniform when the coupling is subjected to full load.

5. A coupling for connecting driving and driven shafts comprising a pair of hubs connectable to said shafts for rotation therewith and having interior surfaces in spaced facing relationship defining a coupling gap, each of said hubs being provided with a plurality of axially extending teeth having their adjacent side faces defining slots therebetween, each of said teeth having a top surface which slopes toward the interior surface of the hub; and a grid member received within said slots to form a resilient torque transmitting element between said hubs, the slope from the radial of the top surface of each tooth being not greater than 5.33 times the ratio of one-half of the coupling gap to the radial width of the grid member.

6. A resilient coupling for connecting driving and driven shafts comprising a pair of hubs for attachment to said shafts for rotation therewith and having interior surfaces in facing relationship, each of said hubs having a plurality of peripherally spaced and axially extending teeth, said teeth having side faces which are curved in the axial direction and which have a radial height which increases linearly from a minimum adjacent the interior surface of the hub to a maximum at the radially outer surface of the teeth; and a grid member received between said teeth to form a torque transmitting element between said hubs whereby the distribution of stress on the cross section of the grid member is uniform when the coupling is subjected to full load.

References Cited in the file of this patent

UNITED STATES PATENTS 2,027,842   Schmitter et al. _____ Jan. 14, 1936